No. 684,089. Patented Oct. 8, 1901.
A. PIETERS.
PLUMB AND LEVEL INDICATOR.
(Application filed Apr. 16, 1901.)
(No Model.)
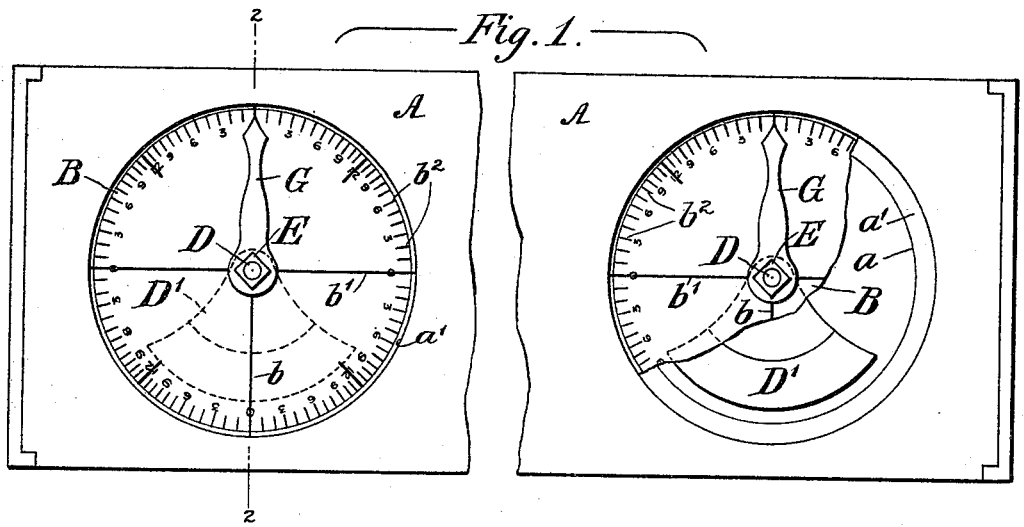
Fig. 1.
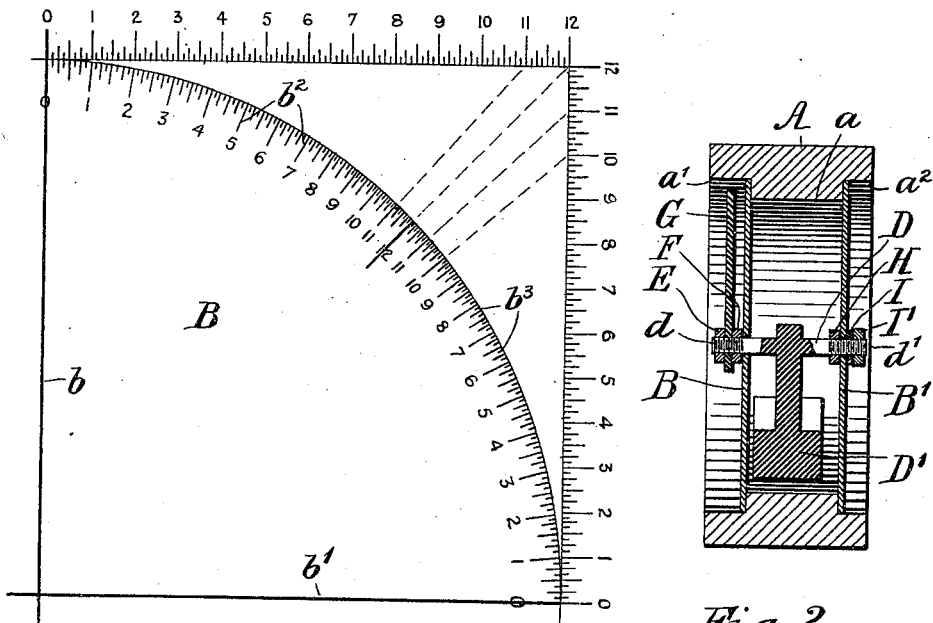
Fig. 3.
Fig. 2.
WITNESSES:
O. C. Winge
J. B. Clantice
INVENTOR
Anton Pieters
BY
Thomas Drew Stetson
ATTORNEY
THE NORRIS PETERS CO., PHOTO-LITHO., WASHINGTON, D. C.

UNITED STATES PATENT OFFICE.

ANTON PIETERS, OF NEW YORK, N. Y.

PLUMB AND LEVEL INDICATOR.

SPECIFICATION forming part of Letters Patent No. 684,089, dated October 8, 1901.

Application filed April 16, 1901. Serial No. 56,055. (No model.)

*To all whom it may concern:*

Be it known that I, ANTON PIETERS, a citizen of the United States, residing in the borough of Manhattan, in the city and State of New York, have invented a certain new and useful Improvement in Plumb and Level Indicators, of which the following is a specification.

I have devised a construction especially adapted for use by illiterate workmen. It indicates the divergences from plumb and level to be read directly from the graduations.

I have shown two of the devices, one near each end of the instrument. They are adjusted alike. In level and approximately level work, such as grading streets and sidewalks, either end is accessible. In making vertical or nearly vertical work, as the sides of chimneys and batter-walls, the upper will usually be more conveniently presented for inspection.

The accompanying drawings form a part of this specification and represent what I consider the best means of carrying out the invention.

Figure 1 is a side view of the instrument in use. Fig. 2 is a cross-section on the line 2 2 in Fig. 1. Fig. 3 is a face view of a portion enlarged with a diagram of the lines by which the graduations are determined.

Similar letters of reference indicate corresponding parts in all the figures where they appear.

A is the body, of hard and well-seasoned wood.

$a$ is a hole bored uniformly with rabbets $a'$ $a^2$ to hold covering-plates in sunk positions, and B B' are such plates, of tinned iron, brass, or other metal. The outer face of each of the front plates B is peculiarly graduated, and the plates are firmly and permanently secured. The two devices are alike, and a description of one will serve for both.

D is a shaft supported in bearings in the plates B B' and carrying a firmly-fixed weight D'. It is screw-threaded at each end, as indicated by $d$ $d'$. A nut E is set on the front end, and F is a corresponding nut adapted to clamp a hand G between itself and the accompanying nut E, so as to be set in any position when the clamping action of the nut E is relaxed. The outer face of each front plate B is graduated by strong cross-lines $b$ $b$ and $b'$ $b'$ and by lesser graduation-marks $b^2$ $b^3$. All the graduations are radial and are arranged so that the tangents of the angles correspond to the different ratios of the inclinations as indicated, showing them, in ordinary workmen's language, so many inches or eighths of an inch of vertical measurement to a foot of horizontal measurement in approximately level work and so many inches or eighths of an inch of horizontal measurement to the foot of vertical measurement in approximately perpendicular work. I thus graduate the entire circumference of each circle, the graduations growing less each way from the plumb-line to the half-way line, the angle of forty-five degrees, and correspondingly growing less each way from the horizontal line to the same meeting-point, the graduation for forty-five degrees.

The sinking of the plates B and B' and of the nuts and hands within the wood portion A allows the instrument to be handled with ordinary roughness without any glass protection outside. The absence of glass allows easy access for adjustment of the nuts E and the hands and, what is more frequently required, for marking with a fine lead-pencil or other plainly-visible but fugitive marks the graduations which the workman is to work by. If it is the tiling of a porch with an inclination of three-eighths of an inch to the foot, the master-workman makes a plain mark with a pencil against the third of the small graduations $b^3$, and the workman has no occasion to tax his mental powers.

Modifications may be made without departing from the principle or sacrificing the advantages of the invention. I can use only one device, locating that at the mid-length.

I claim as my invention—

In a plumb and level indicator, in combination with a body A having a dial-plate B recessed into the body, the loaded shaft protruding partly into the recess, an index-hand thereon directly accessible, provisions by the nut I and jam-nut I' for adjusting the index-hand on the shaft, and graduations $b^2$ $b^3$ diminishing from the plumb and the level mark respectively according to the tangents of the inclinations, all adapted to serve substantially as herein specified.

In testimony that I claim the invention above set forth I affix my signature in presence of two witnesses.

ANTON PIETERS.

Witnesses:
J. B. CLAUTICE,
M. F. BOYLE.